United States Patent [19]
Dewprashad et al.

[11] Patent Number: 5,996,694
[45] Date of Patent: Dec. 7, 1999

[54] METHODS AND COMPOSITIONS FOR PREVENTING HIGH DENSITY WELL COMPLETION FLUID LOSS

[75] Inventors: Brahmadeo T. Dewprashad, Lawton; R. Clay Cole, Duncan, both of Okla.

[73] Assignee: Halliburton Energy Service, Inc., Duncan, Okla.

[21] Appl. No.: 08/975,206

[22] Filed: Nov. 20, 1997

[51] Int. Cl.$^6$ .............................. E21B 33/13; C09K 7/02
[52] U.S. Cl. ........................................... 166/294; 507/903
[58] Field of Search .................... 166/294, 295, 166/300; 507/903, 925

[56] References Cited

U.S. PATENT DOCUMENTS

| | | | |
|---|---|---|---|
| 4,069,869 | 1/1978 | Sandiford | 166/270 |
| 4,536,297 | 8/1985 | Loftin et al. | 507/121 |
| 4,554,081 | 11/1985 | Borchardt et al. | 507/121 |
| 4,758,357 | 7/1988 | Hoff | 507/216 |
| 4,799,550 | 1/1989 | Harris et al. | 166/300 |
| 5,067,565 | 11/1991 | Holtmyer et al. | 166/305.1 |
| 5,304,620 | 4/1994 | Holtmyer et al. | 527/310 |
| 5,316,082 | 5/1994 | Jennings, Jr. | 166/281 |
| 5,478,802 | 12/1995 | Moradi-Araghi | 507/203 |
| 5,547,026 | 8/1996 | Brannon et al. | 166/295 |
| 5,680,900 | 10/1997 | Nguyen et al. | 166/295 |
| 5,919,739 | 7/1999 | Sunde et al. | 507/213 |

*Primary Examiner*—William Neuder
*Assistant Examiner*—John Kreck
*Attorney, Agent, or Firm*—Robert A. Kent; C. Clark Dougherty, Jr.

[57] ABSTRACT

Methods and compositions for preventing high density well completion fluid loss are provided. The methods basically comprise the steps of preparing a high density cross-linked aqueous gelled composition having the rigidity required to resist entry into a permeable subterranean formation penetrated by a well bore, placing the high density cross-linked aqueous gelled composition in the portion of the well bore within the permeable subterranean formation and placing a high density completion fluid in the well bore behind the high density cross-linked gelled composition.

11 Claims, No Drawings

METHODS AND COMPOSITIONS FOR PREVENTING HIGH DENSITY WELL COMPLETION FLUID LOSS

BACKGROUND OF THE INVENTION

1. Field of the Invention.

The present invention relates to methods and compositions for preventing the loss of high density completion fluids used in completing wells.

2. Description of the Prior Art.

In drilling a well bore penetrating one or more subterranean formations, a drilling fluid is generally circulated through the well bore to provide hydrostatic pressure in the well bore, remove cuttings therefrom, lubricate the drill bit, etc. Most drilling fluids are comprised of water containing a viscosity increasing material and a weighting material such as barite for increasing the density thereof. A variety of additives are also commonly included in drilling fluids to impart desired properties thereto such as low fluid loss and the like.

After the well bore penetrates a permeable subterranean formation containing hydrocarbons, casing is often cemented in the well bore and perforations are formed therein which extend from the well bore through the casing and cement into the hydrocarbon containing formation. Thereafter additional well completion operations can be carried out in the well bore such as the installation of a prepacked screen or other screening device, the formation of a gravel pack, etc.

In order to prevent damage to the permeable hydrocarbon containing formation, prior to perforating the formation the drilling fluid in the well bore is often replaced with a completion fluid comprised of a non-damaging aqueous salt solution which does not contain insoluble solids. When the producing formation penetrated by the well bore contains fluids under high pressure, the completion fluid utilized must have a very high density, i.e., a density up to about 21.5 pounds per gallon to prevent the pressurized fluids from blowing out the well bore. Typically, the completion fluid is an aqueous solution of one or more salts such as potassium chloride, sodium chloride, calcium chloride, sodium bromide, calcium bromide, zinc chloride and zinc bromide. The cost of a high density aqueous solution of such a salt or salts is very high, and as a result, after being used the completion fluid is recovered, filtered and reused. However, during the use of a high density completion fluid in a well being completed, portions of the completion fluid can and very often are lost into the permeable formation penetrated by the well bore. While such fluid loss has been reduced through the use of various fluid loss control additives known to those skilled in the art, portions of the completion fluid are still often lost, particularly during gravel packing and other similar procedures.

Thus, there is a need for methods and compositions for preventing the loss of high density well completion fluids.

SUMMARY OF THE INVENTION

By the present invention, methods and compositions for preventing high density well completion fluid loss are provided which meet the need described above and overcome the deficiencies of the prior art.

The methods of the invention for completing a well requiring the use of a high density completion fluid without losing portions of the completion fluid into a permeable subterranean formation penetrated by the well bore are basically comprised of the following steps. A high density cross-linked aqueous gelled composition is prepared comprised of an aqueous salt solution having a density in the range of from about 11 to about 21.5 pounds per gallon, a hydratable and cross-linkable gelling agent and a cross-linking agent. The high density cross-linked aqueous gel formed has the rigidity required to resist entry into the permeable subterranean formation penetrated by the well bore.

After preparation of the high density cross-linked aqueous gelled composition, it is placed into the well bore in an amount sufficient to fill the portion of the well bore which penetrates the permeable subterranean formation Thereafter, a high density well completion fluid is placed in the well bore behind the high density cross-linked gelled composition therein whereby the cross-linked gelled composition prevents the completion fluid from entering or being lost into the permeable subterranean formation.

Methods of forming the high density cross-linked aqueous gelled compositions used as described above and the compositions so formed are also provided by the present invention.

It is, therefore, a general object of the present invention to provide methods and compositions for preventing high density well completion fluid loss.

Other and further objects, features and advantages of the invention will be readily apparent to those skilled in the art upon a reading of the description of preferred embodiments which follows.

DESCRIPTION OF PREFERRED EMBODIMENTS

As mentioned above, methods and compositions are provided for completing a well requiring the use of a high density completion fluid without losing portions of the completion fluid into a permeable subterranean formation penetrated by the well bore. In addition, this invention provides methods of preparing a high density cross-linked aqueous gel which has the rigidity required to resist entry into permeable subterranean formations.

The methods of this invention for preventing high density well completion fluid loss are basically comprised of the steps of preparing a high density cross-linked aqueous gelled composition comprised of an aqueous salt solution, a hydratable and cross-linkable gelling agent and a cross-linking agent having the rigidity required to resist entry into a permeable subterranean formation penetrated by a well bore, placing the high density cross-linked aqueous gelled composition in the well bore in an amount sufficient to fill the portion of the well bore within the permeable subterranean formation and placing the high density completion fluid in the well bore behind the high density cross-linked gelled composition therein whereby the cross-linked gelled composition prevents the completion fluid from being lost into the permeable subterranean formation.

The aqueous salt solution utilized to form the compositions of this invention typically has a density in the range of from about 11 to about 21.5 pounds per gallon and is comprised of water and one or more salts selected from the group of potassium chloride, sodium chloride, calcium chloride, sodium bromide, calcium bromide, zinc chloride and zinc bromide. A preferred such aqueous salt solution is comprised of water and zinc bromide. The aqueous salt solution is generally included in the cross-linked gelled composition in an amount in the range of from about 60% to about 95% by weight of the composition.

A variety of hydratable and cross-linkable gelling agents can be employed in the high density cross-linked aqueous gelled compositions. Suitable such gelling agents include natural and derivatized polysaccharides which are soluble, dispersable or swellable in an aqueous liquid to yield viscosity to the liquid. Examples of suitable natural polysaccharides which can be utilized include arabic gum, ghatti gum, karaya gum, tamarind gum, tragacanth gum, guar gum, locust bean gum and the like. Modified gums such as carboxyalkyl and hydroxyalkyl derivatives, e.g., carboxymethylguar and hydroxypropylguar and doubly derivatized gums such as carboxymethylhydroxypropylguar can also be employed.

Modified celluloses and derivatives thereof such as cellulose ethers, esters and the like are also suitable for use as gelling agents in accordance with the present invention. Of these, water-soluble cellulose ethers are preferred including, but not limited to, the various carboxyalkylcellulose ethers such as carboxyethylcellulose and carboxymethylcellulose, mixed ethers such as carboxymethyl-hydroxyethylcellulose, hydroxyalkylcelluloses such as hydroxyethylcellulose and hydroxypropylcellulose, alkylhydroxyalkylcelluloses such as methylhydroxypropylcellulose, alkylcelluloses such as methylcellulose, ethylcellulose and propylcellulose, alkylcarboxyalkylcelluloses such as ethylcarboxymethylcellulose, alkylalkylcelluloses such as methylethylcellulose, hydroxyalkylalkylcelluloses such as hydroxypropylmethylcellulose and the like.

A preferred derivatized cellulose ether is a cellulose ether grafted with vinyl phosphonic acid such as those disclosed in U.S. Pat. No. 5,067,565 issued to Holtmyer, et al. on Nov. 26, 1991, the disclosure of which is incorporated herein by reference. The most preferred hydratable and cross-linkable gelling agents for use in accordance with the present invention are guar, hydroxypropyl-guar, carboxymethylhydroxypropylguar, carboxymethylcellulose, hyrdoxyethylcellulose, carboxymethylhydroxyethylcellulose and hydroxyethylcellulose grafted with vinyl phosphonic acid. The gelling agent utilized is included in the cross-linked composition in an amount in the range of from about 0.25% to about 10% by weight of the composition.

Various cross-linking agents can be utilized in the compositions including, but not limited to, borate releasing compounds and compounds capable of releasing polyvalent metal cations such as magnesium, aluminum, titanium, zirconium, chromium and antimony. Examples of such cross-linking agents include a borate releasing compound such as sodium tetraborate and transition metal ion releasing compounds such as titanium dioxide, zirconium oxychloride and aluminum, zirconium or titanium chelates. Preferably, the cross-linking agent utilized is one that is delayed in cross-linking the hydrated gelling agent by reacting the cross-linking agent with a chelate introduction of the aqueous gel into a well bore before the gel is cross-linked and the viscosity thereof significantly increased. The most preferred cross-linking agent for us in accordance with this invention is a mixture of aqueous zirconium lactate and magnesium oxide. Generally, the cross-linking agent used is included in the cross-linked composition in an amount in the range of from about 0.1% to about 5% by weight of the composition.

The high density cross-linked aqueous gelled composition produced can also include other conventional additives such as pH adjusting and control agents, gel breakers and the like which do not adversely react with or otherwise affect other components in the composition.

High density cross-linked aqueous gelled compositions containing high concentrations of the above mentioned salts have heretofore been difficult or impossible to prepare. That is, it has been difficult to hydrate a gelling agent in a saturated or nearly saturated brine due to the lack of free water therein, and it has been difficult to cross-link the gel at a slow enough rate to permit mixing but yet yield a rigid gel that withstands the acidity of the saturated or nearly saturated aqueous salt solution. These problems have been obviated by the methods of this invention for preparing the high density cross-linked aqueous gel compositions. Such methods basically comprise the steps of combining from about 25 parts to about 100 parts by weight of the hydratable and cross-linkable gelling agent used with a relatively small quantity of water, i.e., from about 100 parts to about 200 parts by weight of water to form a well dispersed slurry of the gelling agent in the water. The water utilized should be fresh water or water containing a relatively small amount of dissolved salt or salts. To cause the uniform dispersion and hydration of the gelling agent, from about 10 to about 25 parts by weight of ethylene glycol is preferably included in the slurry. The pH of the slurry is next adjusted to in the range of from about 0.01 to about 3. Thereafter, the aqueous salt solution of the type described above having a density in the range of from about 11 to about 21.5 pounds per gallon is combined with the slurry to form an aqueous gelled salt solution. The amount of the aqueous salt solution added to the slurry is generally in the range of from about 60% to about 95% by weight of the resulting aqueous gelled salt solution. The pH of the aqueous gelled salt solution is next adjusted to a level in the range of from about 1 to about 6 to increase its stability and a cross-linking agent of the type described above is combined therewith. The amount of cross-linking agent added is in the range of from about 0.1% to about 5% by weight of the resulting composition. As mentioned above, the resulting stable, high density, cross-linked aqueous gelled composition develops a stiffness or rigidity sufficient to resist entry into a permeable subterranean formation when in contact therewith.

As will now be understood by those skilled in the art, a cross-linked gelled composition of the present invention is displaced into a well bore or otherwise placed therein in an amount sufficient to fill the portion of the well bore containing perforations communicating one or more permeable hydrocarbon containing formations with the well bore or in an amount sufficient to cover the faces of such permeable subterranean formations into which completion fluid may be lost. Because the composition is cross-linked, it is formed into a rigid gel which resists entry into permeable formations. The high density completion fluid utilized is placed in the well bore behind the gelled composition of this invention so that the total hydrostatic pressure exerted on pressurized fluid containing formations is sufficient to prevent blow-outs. The rigid gel functions to transmit hydrostatic pressure but it blocks the high density completion fluid from entering or being lost into the permeable formation or formations.

In order to further illustrate the methods and composition of the present invention, the following laboratory example is given.

EXAMPLE

In a Waring blender operated at low speed, 140 milliliters of fresh water were combined with 16 milliliters of ethylene glycol and 48 grams of a gelling agent comprised of hydroxyethylcellulose grafted with vinyl phosphonic acid. The mixture was thoroughly mixed in the blender until a uniform lump-free dispersion was obtained. 10 milliliters of 20Be hydrochloric acid were then added to the dispersion to adjust the pH thereof to a level in the range of from less than 1 to 2.5. Thereafter, small aliquots of 775 milliliters of an aqueous solution of zinc bromide having a density of 21 pounds per gallon were combined with the dispersion in the blender over a period of about five minutes with constant mixing. The mixture was stirred at low speed for an additional one hour. 100 milliliters of the resulting gel were next combined in a mixer with 2 milliliters of a 50% aqueous solution of sodium hydroxide to adjust the pH of the gel to near 6. Thereafter, a cross-linking agent comprised of 0.36 grams of aqueous zirconium lactate and 0.6 milliliters of magnesium oxide slurried in 2 milliliters of water was added to the gel. The gel was placed in a pressure bottle and allowed to cross-link whereupon a 21 pounds per gallon aqueous zinc bromide solution was added on top of the cross-linked gel. The bottle was then placed in a water bath at 214° F. The highly rigid cross-linked gel formed remained stable and supported the zinc bromide solution for 36 hours whereupon the test was discontinued.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of completing a well requiring the use of a high density completion fluid without losing portions of the completion fluid into a permeable subterranean formation penetrated by the well bore comprising the steps of:

(a) preparing a high density cross-linked aqueous gelled composition having the rigidity required to resist entry into said permeable subterranean formation said gelled composition being comprised of an aqueous salt solution having a density in the range of from about 11 to about 21.5 pounds per gallon, a hydratable and cross-linkable gelling agent and a cross-linking agent;

(b) placing said high density cross-linked aqueous gelled composition in said well bore in an amount sufficient to fill the portion of said well bore within said permeable subterranean formation; and (c) placing said high density completion fluid in said well bore behind said high density cross-linked gelled composition therein whereby said cross-linked gelled composition prevents said completion fluid from being lost into said permeable subterranean formation.

2. The method of claim 1 wherein said aqueous salt solution in said gelled composition is comprised of water and one or more salts selected from the group of potassium chloride, sodium chloride, calcium chloride, sodium bromide, calcium bromide, zinc chloride and zinc bromide.

3. The method of claim 1 wherein said aqueous salt solution is present in said cross-linked gelled composition in an amount in the range of from about 60% to about 90% by weight of said composition.

4. The method of claim 1 wherein said hydratable and cross-linkable gelling agent is comprised of at least one member selected from the group of guar, hydroxypropylguar, carboxymethylhydroxypropylguar, carboxymethylcellulose, hydroxyethylcellulose and carboxymethylhydroxyethylcellulose.

5. The method of claim 1 wherein said hydratable and cross-linkable gelling agent is comprised of a carboxyalkyl cellulose ether grafted with vinyl phosphonic acid.

6. The method of claim 1 wherein said hydratable and cross-linkable gelling agent is comprised of hydroxyethylcellulose grafted with vinyl phosphonic acid.

7. The method of claim 1 wherein said hydratable and cross-linkable gelling agent is present in said composition in an amount in the range of from about 0.25% to about 10% by weight of said composition.

8. The method of claim 1 wherein said cross-linking agent is comprised of a compound capable of releasing a polyvalent metal cation selected from the group of magnesium, aluminum, titanium, zirconium, chromium and antimony.

9. The method of claim 1 wherein said cross-linking agent is delayed in cross-linking said gelling agent by a chelate reacted therewith.

10. The method of claim 1 wherein said cross-linking agent is comprised of a mixture of aqueous zirconium lactate and magnesium oxide.

11. The method of claim 1 wherein said cross-linking agent is present in said composition in an amount in the range of from about 0.1% to about 5% by weight of said composition.

* * * * *